(12) United States Patent
Zhang et al.

(10) Patent No.: US 11,797,028 B2
(45) Date of Patent: Oct. 24, 2023

(54) UNMANNED AERIAL VEHICLE CONTROL METHOD AND DEVICE AND OBSTACLE NOTIFICATION METHOD AND DEVICE

(71) Applicant: SZ DJI TECHNOLOGY CO., LTD., Shenzhen (CN)

(72) Inventors: Wei Zhang, Shenzhen (CN); Ang Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 226 days.

(21) Appl. No.: 16/663,902

(22) Filed: Oct. 25, 2019

(65) Prior Publication Data

US 2020/0201361 A1 Jun. 25, 2020

Related U.S. Application Data

(63) Continuation of application No. PCT/CN2017/082190, filed on Apr. 27, 2017.

(51) Int. Cl.
*G06T 7/73* (2017.01)
*B64C 39/02* (2023.01)
(Continued)

(52) U.S. Cl.
CPC ........... *G05D 1/106* (2019.05); *B64C 39/024* (2013.01); *G05D 1/0094* (2013.01); *G05D 1/1064* (2019.05); *G06T 7/74* (2017.01); *G08G 5/0069* (2013.01); *G08G 5/045* (2013.01); *B64U 2101/30* (2023.01)

(58) Field of Classification Search
CPC .... G05D 1/106; G05D 1/1064; G05D 1/0094; G05D 1/101; G06T 7/74; G06T 2207/10028; G06T 2207/10032; G06T 2207/30261; G06T 7/70; B64C 39/024; B64C 2201/127; B64C 2201/14; G08G 5/0069; G08G 5/045; G08G 5/04
See application file for complete search history.

(56) References Cited

U.S. PATENT DOCUMENTS 9,164,506 B1 * 10/2015 Zang .................... G05D 1/12
2007/0018887 A1    1/2007 Feyereisen et al.
(Continued)

FOREIGN PATENT DOCUMENTS

CN    102528811 A    7/2012
CN    103439973 A    12/2013
(Continued)

OTHER PUBLICATIONS

English_Translation_KR20130009894A (Year: 2013).*
(Continued)

*Primary Examiner* — Peter D Nolan
*Assistant Examiner* — Ashley L Redhead, Jr.
(74) *Attorney, Agent, or Firm* — ANOVA LAW GROUP, PLLC

(57) ABSTRACT

A method for controlling an unmanned aerial vehicle ("UAV") includes obtaining depth data of one or more obstacles in a flight space. The method also includes determining information of an obstacle that triggers an obstacle avoidance operation based on the depth data. The method further includes transmitting the information of the obstacle to a control terminal of the UAV.

20 Claims, 11 Drawing Sheets

(51) Int. Cl.
*G08G 5/04* (2006.01)
*G05D 1/10* (2006.01)
*G05D 1/00* (2006.01)
*G08G 5/00* (2006.01)
*B64U 101/30* (2023.01)

(56) References Cited

U.S. PATENT DOCUMENTS

| | | | | |
|---|---|---|---|---|
| 2010/0017046 | A1* | 1/2010 | Cheung | G05D 1/0094 701/2 |
| 2016/0068267 | A1* | 3/2016 | Liu | G05D 1/0061 701/4 |
| 2016/0070265 | A1* | 3/2016 | Liu | G05D 1/0088 701/3 |
| 2016/0306351 | A1* | 10/2016 | Fisher | G05D 1/0044 |
| 2017/0076616 | A1* | 3/2017 | Kanade | G06V 20/17 |
| 2017/0193830 | A1* | 7/2017 | Fragoso | G05D 1/102 |
| 2017/0243355 | A1* | 8/2017 | Lin | H04N 7/188 |
| 2018/0033318 | A1* | 2/2018 | Yeh | G05D 1/106 |
| 2018/0120852 | A1* | 5/2018 | Cho | G05D 1/027 |
| 2018/0292206 | A1* | 10/2018 | Ohki | G06T 7/557 |

FOREIGN PATENT DOCUMENTS

| | | | |
|---|---|---|---|
| CN | 104044745 | A | 9/2014 |
| CN | 104608692 | A | 5/2015 |
| CN | 104750110 | A | 7/2015 |
| CN | 105138002 | A | 12/2015 |
| CN | 204946369 | U | 1/2016 |
| CN | 105517666 | A | 4/2016 |
| CN | 105973230 | A | 9/2016 |
| CN | 106527424 | A | 3/2017 |
| KR | 20130009894 | A * | 1/2013 |
| KR | 20130009894 | A | 1/2013 |

OTHER PUBLICATIONS

Jongho Park, Oct. 17, 2012, "Stereo Vision Based Collision Avoidance of Quadrotor UAV", 2012 12th International Conference on Control, Automation and Systems, IEEE (Year: 2012).*

The World Intellectual Property Organization (WIPO) International Search Report for PCT/CN2017/082190 dated Feb. 5, 2018 6 pages.

* cited by examiner

UNMANNED AERIAL VEHICLE CONTROL METHOD AND DEVICE AND OBSTACLE NOTIFICATION METHOD AND DEVICE

CROSS-REFERENCE TO RELATED APPLICATION

This application is a continuation application of International Application No. PCT/CN2017/082190, filed on Apr. 27, 2017, the entire content of which is incorporated herein by reference.

TECHNICAL FIELD

The present disclosure relates to the technology field of unmanned aerial vehicles ("UAVs") and, more particularly, to a UAV control method and device, an obstacle notification method and device, and a UAV.

BACKGROUND

Currently, technologies of the UAVs develop rapidly, and the application scope is becoming broader and broader. To enhance the safety performance during a flight of the UAV, the currently available UAVs typically have an obstacle avoidance function, which not only protects the safety of the UAV, but also ensures the safety of the people or objects on the ground.

Currently, when a UAV encounters an obstacle, a smart control system may control, based on information obtained by a sensor, the UAV to execute a corresponding obstacle avoidance operation, such as circling or hovering, thereby avoiding collision of the UAV with the obstacle. However, during the process of the UAV executing the obstacle avoidance operation, operation commands input by a user through a control terminal may be blocked by the smart control system. Because a notification provided on an interactive device at the control terminal is not clear, it tends to cause an illusion in the user that the UAV has malfunction or has lost control. As such, the user cannot understand the current operation state of the UAV. The lack of an effective obstacle notification method may reduce the utility of the UAV under certain conditions.

SUMMARY

In accordance with an aspect of the present disclosure, there is provided a method for controlling an unmanned aerial vehicle ("UAV"). The method includes obtaining depth data of one or more obstacles in a flight space. The method also includes determining information of an obstacle that triggers an obstacle avoidance operation based on the depth data. The method further includes transmitting the information of the obstacle to a control terminal of the UAV.

In accordance with another aspect of the present disclosure, there is provided a device for controlling an unmanned aerial vehicle ("UAV"). The device includes a depth sensor configured to obtain depth data of one or more obstacles in a flight space. The device also includes one or more processors, operating separately or in collaboration and configured to determine information of an obstacle that triggers an obstacle avoidance operation based on the depth data. The one or more processors are also configured to transmit the information of the obstacle to a control terminal of the UAV.

From the above disclosed technical solutions, it can be appreciated that in the embodiments of the present disclosure, when an obstacle triggers an obstacle avoidance operation of the UAV, information of the obstacle that triggers the obstacle avoidance operation may be determined based on depth data of the obstacle in a flight space. The determined information of the obstacle may be transmitted to a control terminal of the UAV. When the control terminal receives the information of the obstacle that triggers the obstacle avoidance operation, the information of the obstacle may be mapped to a real time image displayed on an interactive device. When an obstacle triggers the UAV to perform an obstacle avoidance operation, the user may view the real time image that is mapped with the information of the obstacle on the interactive device, and may know that the UAV is currently performing the obstacle avoidance operation, and would not have a misconception that the UAV is malfunctioning. In the meantime, the user may know the information of the obstacle that triggers the obstacle avoidance operation, such that the user may know, in time, the current flight state of the UAV, which provides an excellent obstacle notification method for the user.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
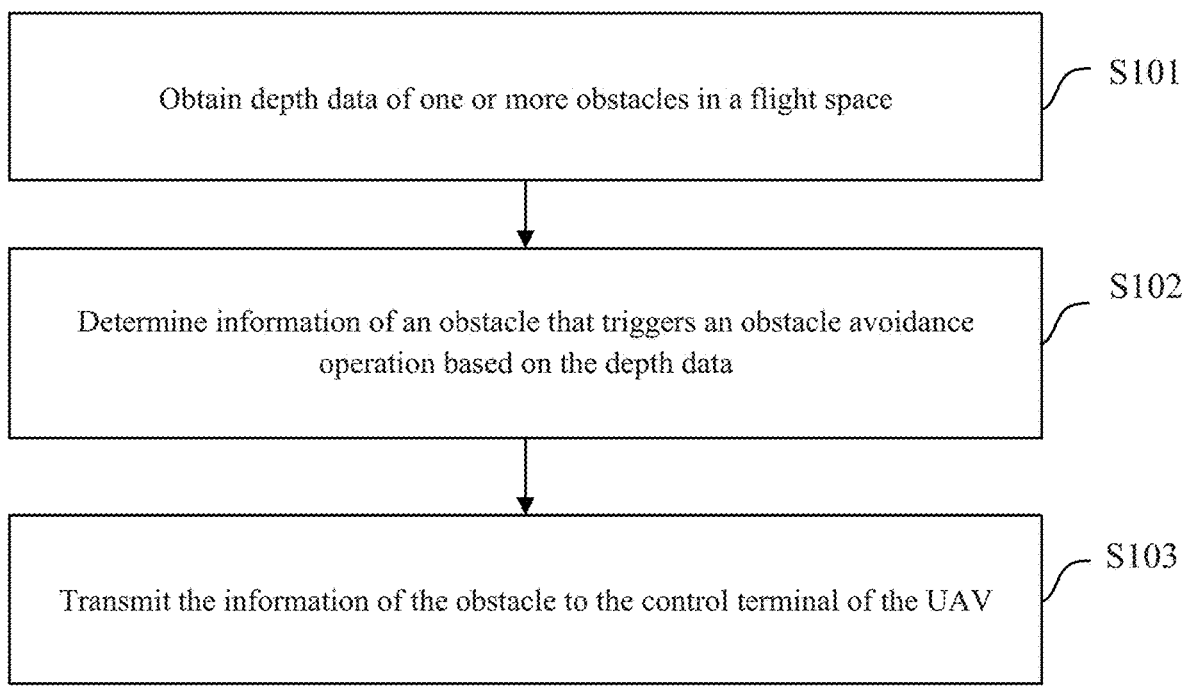
FIG. 1 is a flow chart illustrating a UAV control method, according to an example embodiment.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B. The term "communicatively couple(d)" or "communicatively connect(ed)" indicates that related items are coupled or connected through a communication channel, such as a wired or wireless communication channel. The term "unit" or "module" may encompass a hardware component, a software component, or a combination thereof. For example, a "unit" or "module" may include a processor, a portion of a processor, an algorithm, a portion of an algorithm, a circuit, a portion of a circuit, etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The present disclosure provides a UAV control method (i.e., a method for controlling a UAV). As shown in FIG. 1, the method may include:

Step S101: obtaining depth data of one or more obstacles in a flight space.

Figure 2:
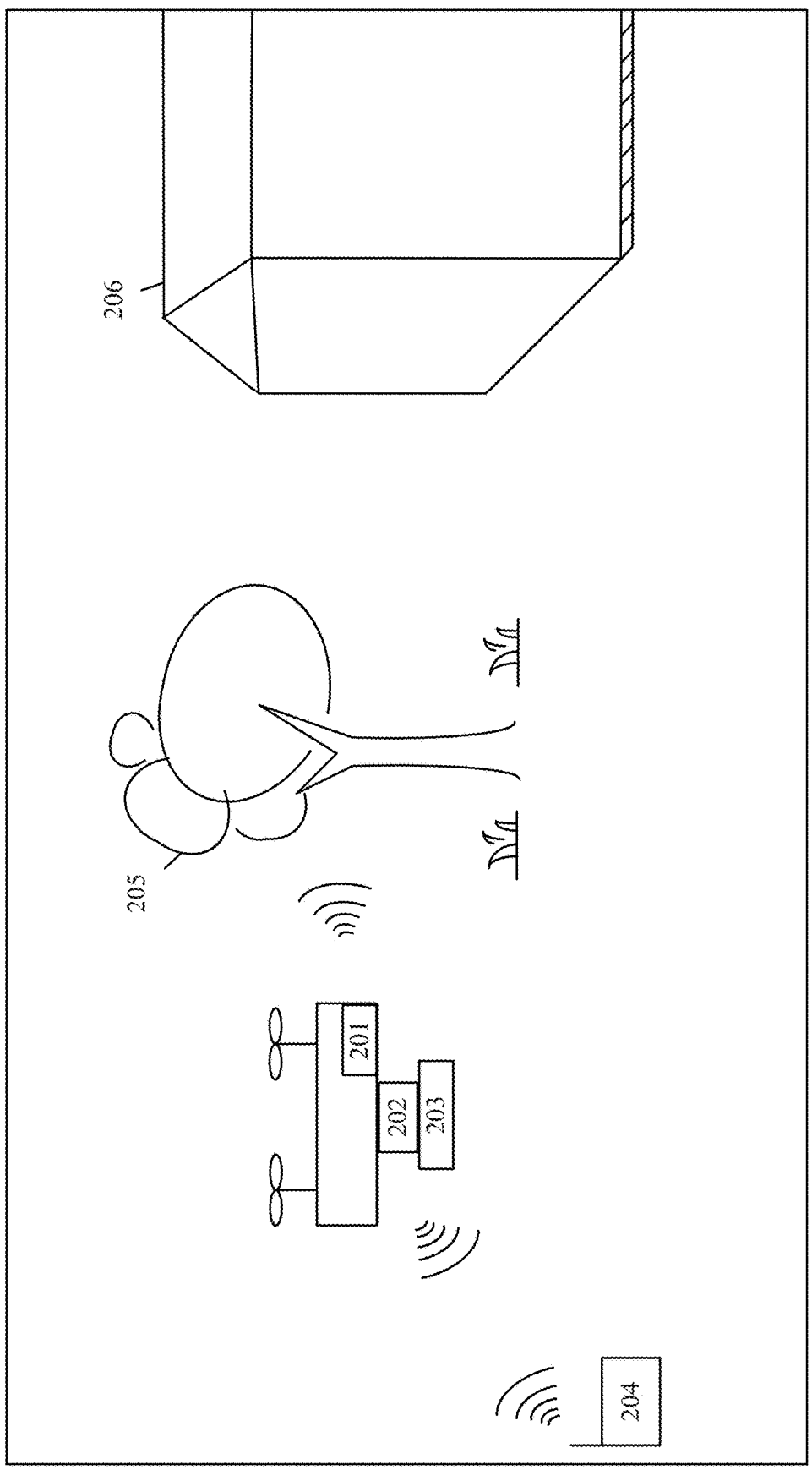
FIG. 2 is a schematic illustration of a process of a flight control of the UAV in a flight space, according to an example embodiment.

In some embodiments, as shown in FIG. 2, a control terminal 204 may be configured to control flight of the UAV in the flight space. The UAV may be provided with a depth sensor 201. For example, the depth sensor 201 may be mounted on an aircraft head of the UAV, or on a gimbal of the UAV, or at the bottom or top of the aircraft, etc. The depth sensor 201 being mounted inside an aircraft body of the UAV as shown in FIG. 2 is only for illustrative purposes. When the UAV flies in the flight space, the depth sensor 201 of the UAV may obtain depth data of obstacles 205, 206, and may obtain depth images based on the depth data. In some embodiments, the depth sensor for obtaining the depth data may be any sensor that can obtain depth data. The depth sensor may be a time of flight ("TOF") camera, a red green blue ("RGB") camera, a binocular camera, a monocular camera, a light detection and ranging ("Lidar"), etc. After the depth data or the depth images of the obstacles are obtained, point cloud information of the obstacles 205, 206 may be obtained through corresponding conversion. As such, through the point cloud information, location information, profile information, and size information, etc., of the obstacles 205, 206 in the current flight space can be obtained.

In some embodiments, the UAV may be provided with an effective load 203. The effective load 203 may be connected with the aircraft body of the UAV through a load bearing member 202. The effective load may include an imaging device, and the load bearing member 202 may be a component for increasing the stability of the imaging device, such as a gimbal. The imaging device may capture images of an object in the flight space. In the meantime, the UAV may transmit real time images captured by the imaging device to a control terminal 204 of the UAV through a downlink data link of the UAV. The control terminal 204 may be provided with an interactive device. The interactive device may display the real time image. In some embodiments, the control terminal of the present disclosure may be a laptop, a tablet, a smart cell phone, a wearable device (e.g., a watch, a wristband), a ground control station, or any combination thereof. The interactive device may include a display (e.g., a touch display), a smart cell phone, a tablet, etc.

Step S102: determining information of an obstacle that triggers an obstacle avoidance operation based on the depth data.

In some embodiments, as shown in FIG. 2, the depth data obtained by the depth sensor 201 may reflect distance state information between different obstacles 205, 206 and the UAV in the current flight space. In the flight of the UAV, when the UAV and an obstacle in the flight space approach one another, and when the distance between the UAV and the obstacle is smaller than or equal to a predetermined distance value, e.g., when the distance between the UAV and the obstacle 205 is smaller than or equal to the predetermined distance value, the obstacle 205 may trigger the obstacle avoidance operation of the UAV. For the flight safety of the UAV, the UAV may circle-fly around the obstacle 205 or hover in front of the obstacle 205. At this moment, the UAV may determine information of the obstacle 205 that triggers the obstacle avoidance operation based on the obtained depth data. In some embodiments, the information of the obstacle 205 may include at least one of location information of the obstacle 205, depth data of the obstacle 205, and classification identification of the obstacle 205 (the classification identification will be described later, so it is not described here).

Step S103: transmitting the information of the obstacle to the control terminal of the UAV.

It can be understood that, when the information of the obstacle 205 that triggers the obstacle avoidance operation of the UAV is determined, the UAV may transmit the information of the obstacle 205 to the control terminal 204 through a downlink data link. After the control terminal 204 obtains the information of the obstacle 205, the display content and/or display method of the interactive device of the control terminal may be adjusted and controlled based on the information of the obstacle 205, such that the adjusted display content and/or the display method can function to notify the user. In some embodiments, the information of the obstacle 205 may be mapped to a real time image captured by the imaging device of the UAV that is received by the control terminal 204. The control terminal 204 may be provided with an interactive device. The control terminal 204 may map the information of the obstacle onto the real time image displayed by the interactive device. As such, by observing the image obtained through mapping, the user may know that the current obstacle that triggers the obstacle avoidance operation is obstacle 205, and currently the UAV is performing an obstacle avoidance operation with respect to the obstacle 205. In other words, this may function to notify the user that the current uncontrollable behavior of the UAV is caused by the obstacle avoidance operation, and is not caused by malfunctioning of the UAV.

In the above technical solution, when the obstacle avoidance operation of the UAV is triggered, information of the obstacle that triggers the obstacle avoidance operation may be determined based on the depth data of the obstacle in the flight space. The determined information of the obstacle may be transmitted to the control terminal of the UAV. The control terminal may map the information of the obstacle onto a real time image displayed on the interactive device. As such, when the obstacle avoidance operation is triggered, the user may know through the control terminal which obstacle in the flight space currently triggers the obstacle avoidance operation of the UAV. At this moment, the user may timely realize that currently the UAV is performing an obstacle avoidance operation, and would not misconceive that the UAV is having malfunctions in itself. As a result, the user can timely understand the current flight state of the UAV.

Figure 3:
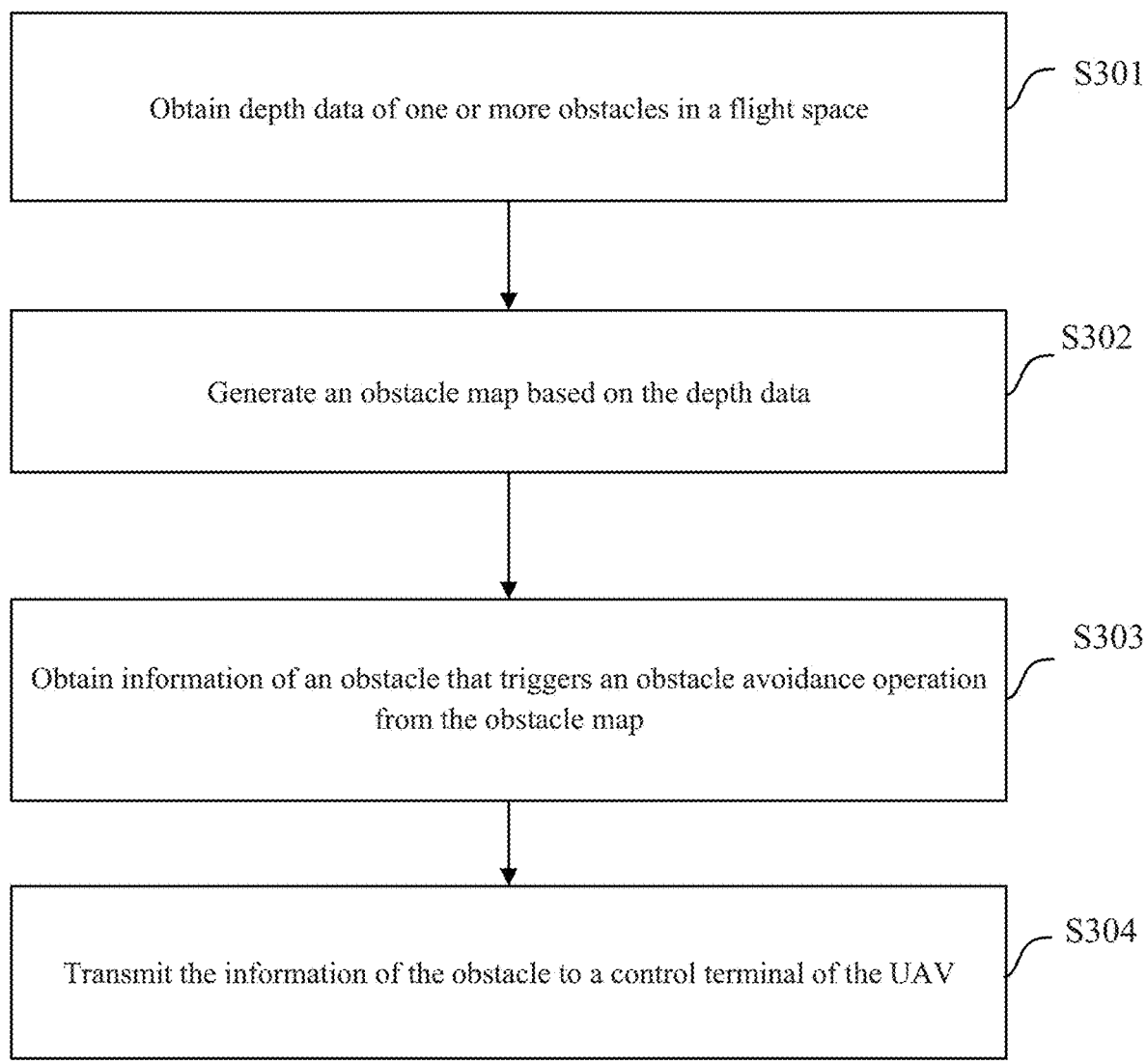
FIG. 3 is a flow chart illustrating a detailed UAV control method, according to an example embodiment.

Based on the UAV control method shown in the embodiment of FIG. 1, the UAV control method shown in the embodiment of FIG. 3 includes the following steps:

Step S301: obtaining depth data of one or more obstacles in a flight space.

In some embodiments, considering the issue of data discontinuity and information loss caused by noise in the depth data obtained by the depth sensor and incorrect information caused by an incorrect detection, in the present embodiment, after the depth data of the obstacle in the flight space, the depth data may be pre-processed. The depth data may include depth images. For example, the depth data may be processed with morphological filtering, to break the gap between the obstacles and/or eliminate isolated noise point and/or smooth the profile of the obstacle, etc. Subsequent steps may be performed based on the pre-processed depth data.

In some embodiments, because obstacles in the flight space are continuous, connected regions in the flight space may be searched for based on the depth data. After the connected regions in the space are found, the obstacles in the flight space may be extracted. Further, the obstacles may be divided into blocks based on the connected regions, to separate different obstacles. Different obstacles may be classified with different identifications. By processing the connected regions, classification identifications may indicate the types of the obstacles, for example, indicating the obstacle is a user, a vehicle, a building, etc.

Step S302: generating an obstacle map based on the depth data.

In some embodiments, after obtaining the depth data of the obstacles, three-dimensional modeling may be performed for the obstacles in the flight space based on the depth data to obtain the obstacle map. For example, the UAV may obtain location information of the UAV and/or the attitude information of the UAV through a sensor system. The obstacle map may be generated based on the depth data, the location information of the UAV and/or the attitude information of the UAV. Attitude of the depth sensor may be determined based on the attitude information of the UAV. It is understood that the depth data described in this step may preferably be the pre-processed depth data.

In some embodiments, during the process of generating the obstacle map, the obstacle map may be generated based on multiple frames of the depth data. During a UAV flight in the flight space, the depth sensor may obtain depth data of the obstacles at different locations in the flight space. The obstacle map corresponding to all of the flight locations of the UAV may be obtained based on the multiple frames of depth data obtained at the different locations by the depth sensor, in combination with the location information of the UAV and/or the attitude information of the UAV. In addition, in some situations, some obstacles in the flight space may move, causing the locations of the obstacles in the flight space to change. Also, a frame of depth data may only reflect a spatial location of the obstacle at a certain time instance, and a frame of depth data may only reflect the spatial distribution of the obstacles when the UAV is at a certain location. Therefore, combining the multiple frames of depth data obtained by the depth sensor, the spatial locations of the obstacles at different time instances may be obtained, i.e., the spatial distribution of the obstacles can be more completely determined. When determining a movement of the obstacles, the UAV may use the most recent depth data obtained through the depth sensor to update the obstacle map. At this moment, the obstacle map may reflect the change of the locations of the obstacles in the flight space. In the meantime, the UAV can sense the complete information about the spatial distribution of the obstacles, ensuring the accuracy of the obstacle map.

Step S303: obtaining information of an obstacle that triggers an obstacle avoidance operation from the obstacle map.

In some embodiments, after generating the obstacle map, the UAV have already known the location distribution situation of the obstacles in the flight space. The UAV may determine whether to trigger an obstacle avoidance operation based on the generated obstacle map and the location of the UAV. When the UAV flies in the flight space, the UAV may query the obstacle map based on location information and attitude information of the UAV to obtain relative information of the obstacles surrounding the UAV, thereby obtaining distances between each of the obstacles surrounding the UAV and the UAV. When a distance between the UAV and an obstacle located adjacent the UAV is smaller than or equal to a predetermined distance value, it may be determined that there is an obstacle that triggers the obstacle avoidance operation in the UAV. At this moment, the UAV may query the obstacle map to determine which obstacle at the current location in the flight space triggers the obstacle avoidance operation. Through the above obstacle map, location information, depth data, classification identification, etc., of the obstacle that triggers the obstacle avoidance operation may be obtained.

Step S304: transmitting the information of the obstacle to a control terminal of the UAV.

The detailed method and principle of steps S304 and S103 may be consistent, which are not repeated.

In some embodiments, weight values may be assigned to at least two frames of depth data included in the multiple frames of depth data based on a predetermined computational model. The obstacle map may be generated based on the assigned weight values and the depth data. In some embodiments, at different time instances when the depth data are measured, the distances between the UAV and the obstacles in the flight space are different, i.e., the distances between the depth sensor and the obstacles are different. Under different measurement distances, the measurement accuracy of the depth sensor may be different. For example, when the TOF camera is 1 meter away from an obstacle, the depth data measured by the TOF camera may be the most accurate. The measurement accuracy corresponding to each frame of the multiple frames of depth data obtained by the depth sensor may be different. Therefore, in the present disclosure, weight values may be assigned to the depth data measured at different time instances based on the predetermined computational model. When the obstacle is located within a distance range corresponding to a relatively high accuracy for the depth sensor, relatively high weight values may be assigned to the obtained frame of depth data. When the obstacle is located within a distance range corresponding to a relatively low accuracy for the depth sensor, relatively low weight values may be assigned to the obtained frame of depth data. By generating the obstacle map through the multiple frames of depth data that have been assigned with weight values, the generated obstacle map may be more accurate. In some embodiments, the computational model may be a measurement accuracy model of the depth sensor.

In some embodiments, in a same frame of depth data, multiple obstacles may exist in the corresponding depth data. The distances between the multiple obstacles and the depth sensor may be different. The measurement accuracy of the depth data corresponding to each obstacle may be different. The measurement accuracy of the depth data corresponding to the obstacles in different measurement ranges may be different. As such, in the present disclosure, different obstacles in the same frame of depth data may be divided into blocks. By dividing the obstacles into blocks, different obstacles may be separated. A weight value may be assigned to a depth corresponding to each obstacle based on the distance between the depth sensor and the obstacle and the accuracy model of the depth sensor. The obstacle map may be generated based on the depth data that have been assigned with depth values. The obstacle map may have a higher accuracy.

In some embodiments, before performing a three-dimensional modeling of the obstacles in the flight space based on the connected regions, the connected regions may be divided into blocks. A weight value may be assigned to each block obtained by dividing the connected regions based on relationship model between the measurement accuracy of the depth sensor and the measurement distance. Subsequently, the weight value of each block may be considered in the process of three-dimensional modeling. To reduce the amount of data processing, in the present disclosure, the blocks having weight values lower than a predetermined weight value may be deleted from the above connected regions.

In some embodiments, a portion of the obstacle map to be deleted may be determined from the map. The portion of the obstacle map to be deleted may be deleted. In some embodiments, as the flight range of the UAV in the flight space increases, the obstacle map generated based on the depth data may become larger and larger. The UAV may need a larger storage space to store the generated obstacle map. Considering that the storage space of the UAV is limited, if the UAV stores all of the obstacle maps of all of the regions the UAV flies by in the storage space of the UAV, it may be a waste of storage resources. As such, it may be desirable to delete some obstacle maps already generated for a specific region. The specific region may be a region that is far away from the current location of the UAV, or a region that the UAV does not re-enter within a predetermined time. The obstacle map for the specific region may be determined and deleted to save the storage resources of the UAV.

In some embodiments, a portion of the obstacle map to be deleted may be determined based on one or more of location information of the UAV, and a predetermined distance value. In some embodiments, during a flight of the UAV, depth data of obstacles may be continuously obtained by a depth sensor carried by the UAV. The obstacle map may be generated based on the depth data of the obstacles. The UAV may store the obstacle map for a specific region that includes the current location of the UAV, and may determine the obstacle map for other regions outside of the specific region as the obstacle map to be deleted. In some embodiments, the specific region may be determined based on the predetermined distance value. For example, the specific region may be a region defined by a center that is the current location of the UAV, and a radius that is the predetermined distance value. The UAV may store the obstacle map of this region, and may delete the obstacle map generated for the other regions outside of this region. As such, during a flight of the UAV, the UAV only need to store the obstacle map for the specific region that includes the current location, which can effectively save the storage resources of the UAV.

In some embodiments, distance information of a gap between the obstacles may be determined based on the obstacle map. Then, information regarding the likelihood of passing the gap may be assessed based on the distance information. The information regarding the likelihood of passing the gap may be transmitted to a control terminal. The information regarding the likelihood of passing the gap may include a result of the likelihood of passing the gap, a distance of the gap (e.g., a minimum distance of the gap, a maximum distance of the gap, an average distance of the gap, etc.). In some embodiments, during a flight of the UAV, the UAV may travel between the obstacles frequently. When no obstacle map has been generated, the real time image received from the UAV by the control terminal only includes RGB information. A user may not obtain the likelihood of passing the gap between the obstacles through the control terminal. As such, if the user makes an incorrect judgment, when the UAV flies between the obstacles, the UAV may collide with the obstacles and have flight accidents. As discussed above, when the obstacle map for the current flight space is already generated, the UAV may determine distance information of the gap between the obstacles based on the obstacle map, and assess the likelihood of passing the gap based on the distance information. The likelihood of passing the gap from the assessment may be transmitted to the control terminal. In some embodiments, the likelihood of passing the gap may be expressed as a safety factor. In some embodiments, the UAV may transmit the distance information between the obstacles to the control terminal. The control terminal may map the likelihood of passing the gap and the distance information of the gap between the obstacles onto the real time image displayed on the interactive device. As such, the user may intuitively determine whether the UAV can pass a gap between two specific obstacles or a gap on an obstacle based on the information regarding the likelihood of passing the gap on the real time image displayed on the control terminal, thereby enhancing the safety level of the user operating the UAV.

In some embodiments, a flight path that circumvents an obstacle that triggers an obstacle avoidance operation may be determined based on the obstacle map. In some embodiments, when the obstacle map is obtained, the UAV has established clear models for the distribution of the obstacles, the obstacle profiles, and the sizes of the obstacles in the flight space. When an obstacle triggers an obstacle avoidance operation of the UAV, the UAV may determine a flight path that circumvents the obstacle through querying the obstacle map. For example, a shortest flight path that circumvents the obstacle may be determined based on the obstacle map, e.g., determining whether to circumvent from the left, to circumvent from the right, or to circumvent from above the obstacle. In some embodiments, a most safe flight path that circumvents the obstacle may be determined based on the obstacle map. For example, if the UAV learns that there are other obstacles on the left and right sides of the obstacle through querying the obstacle map, and there is no other obstacle above the obstacle, the UAV may determine that the most safe flight path is to circumvent the obstacle from above the obstacle. Through querying the obstacle map, the UAV may determine the flight path that circumvents the obstacle that triggers the obstacle avoidance operation based on the obstacle map. The UAV may circumvent the obstacle according to the determined flight path.

In some embodiments, the above information related to the flight path may be transmitted to the control terminal. For example, after determining the flight path that circumvents the obstacle that triggers the obstacle avoidance operation through querying the obstacle map, the UAV may transmit the information related to the flight path to the control terminal on the ground. The control terminal may map the information related to the flight path on the real time image displayed on the interactive device. As such, the user may learn about the circumventing flight path of the UAV and the flight direction of the UAV on the flight path, etc., from the real time image. Currently, a UAV typically includes the depth sensor or other detecting devices only at the aircraft head, can only detect the obstacles in the direction of the aircraft head, but cannot detect obstacles in other directions of the UAV. Therefore, the safety of the UAV is affected. In the present disclosure, information of obstacles currently surrounding the UAV may be determined based on the current location information and the above obstacle map. For example, the UAV may obtain the location information of itself to determine a location of the UAV in the already generated obstacle map. The UAV may query the obstacle map adjacent this location to obtain information related to obstacles in any direction of the UAV. When there is an obstacle in any direction of the UAV that triggers the obstacle avoidance operation of the UAV, the information of the obstacle may be transmitted to the control terminal, to enable the user to more comprehensively learn of information of the obstacles in the flight space in which the UAV is currently located.

Figure 4:
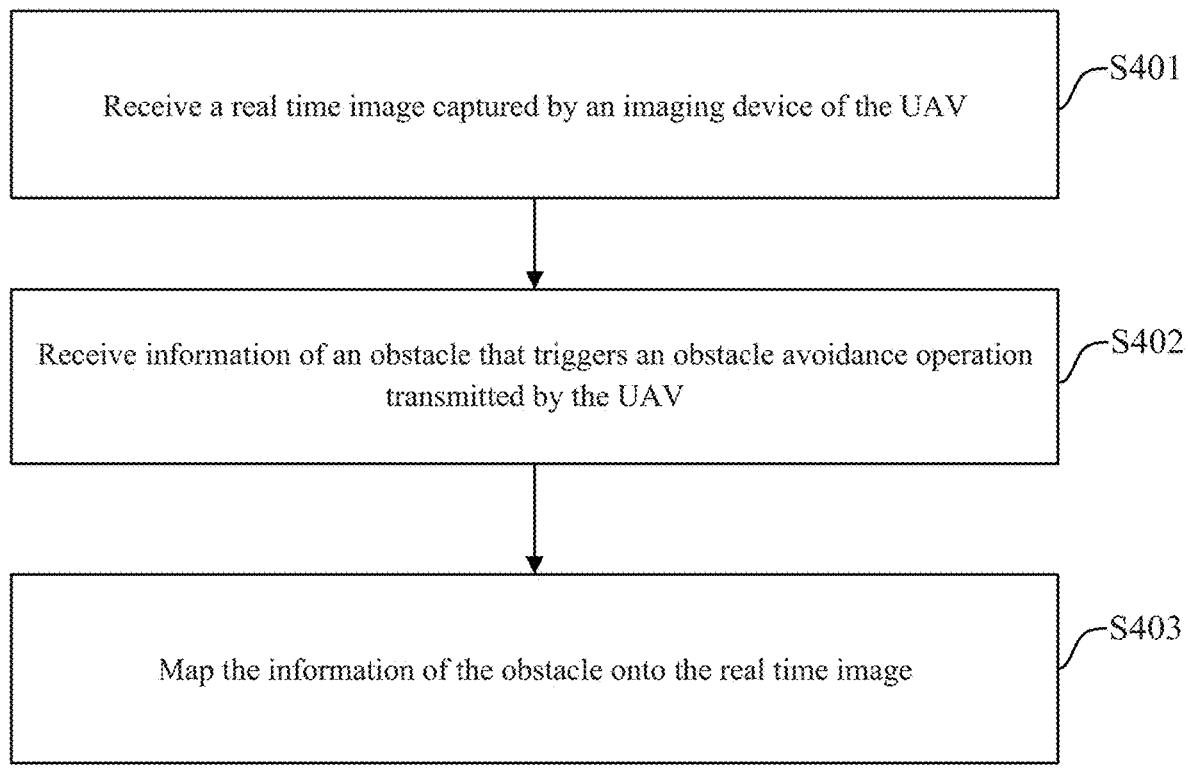
FIG. 4 is a flow chart illustrating a method for obstacle notification, according to an example embodiment.

The present disclosure also provides an obstacle notification method. As shown in FIG. 4, the method may include:

Step S401: receiving a real time image captured by an imaging device of the UAV.

In some embodiments, the UAV may be provided with an imaging device. In a flight of the UAV, the imaging device may capture real time images of a target object in the flight space. The UAV may transmit the real time images to the control terminal through a downlink data link. The control terminal may be provided with an interactive device. The interactive device may display the real time images obtained by the imaging device.

Step S402: receiving information of an obstacle that triggers an obstacle avoidance operation transmitted by the UAV.

As discussed above, when an obstacle in the flight space triggers an obstacle avoidance operation of the UAV, the UAV may transmit information of the obstacle that triggers the obstacle avoidance operation to the control terminal. The method of determining the information of the obstacle can refer to the above content described in the above embodiments, which is not repeated.

Step S403: mapping the information of the obstacle onto the real time image displayed on the interactive device.

Figure 5:
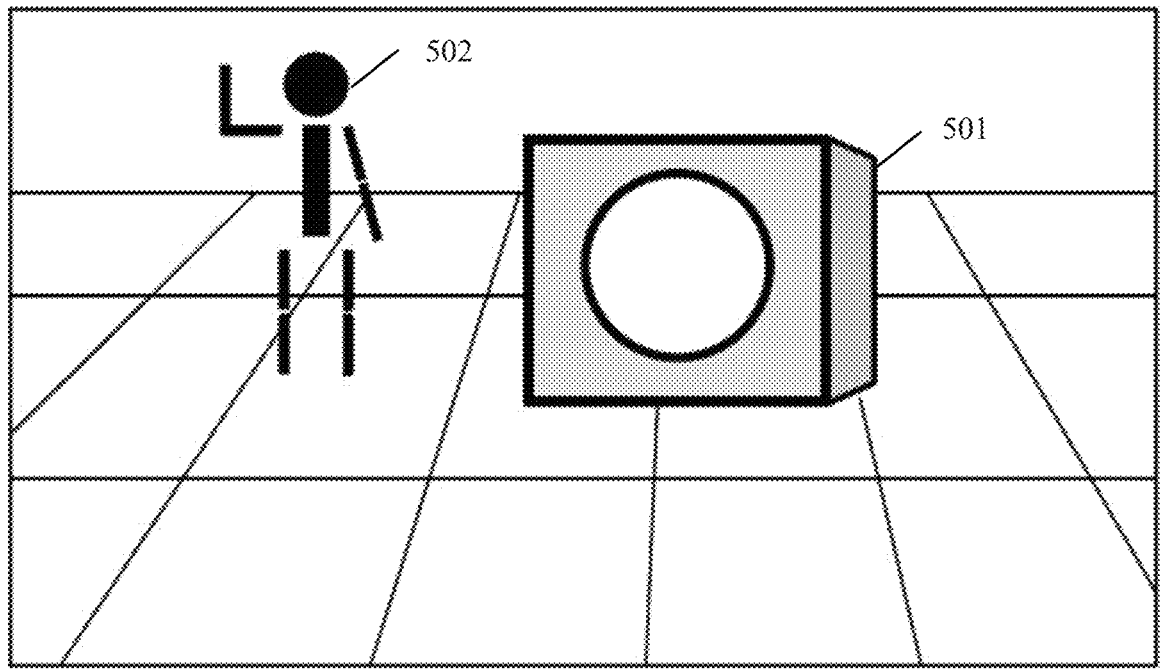
FIG. 5 is a schematic illustration of a display effect of the real time image, according to an example embodiment.
Figure 6:
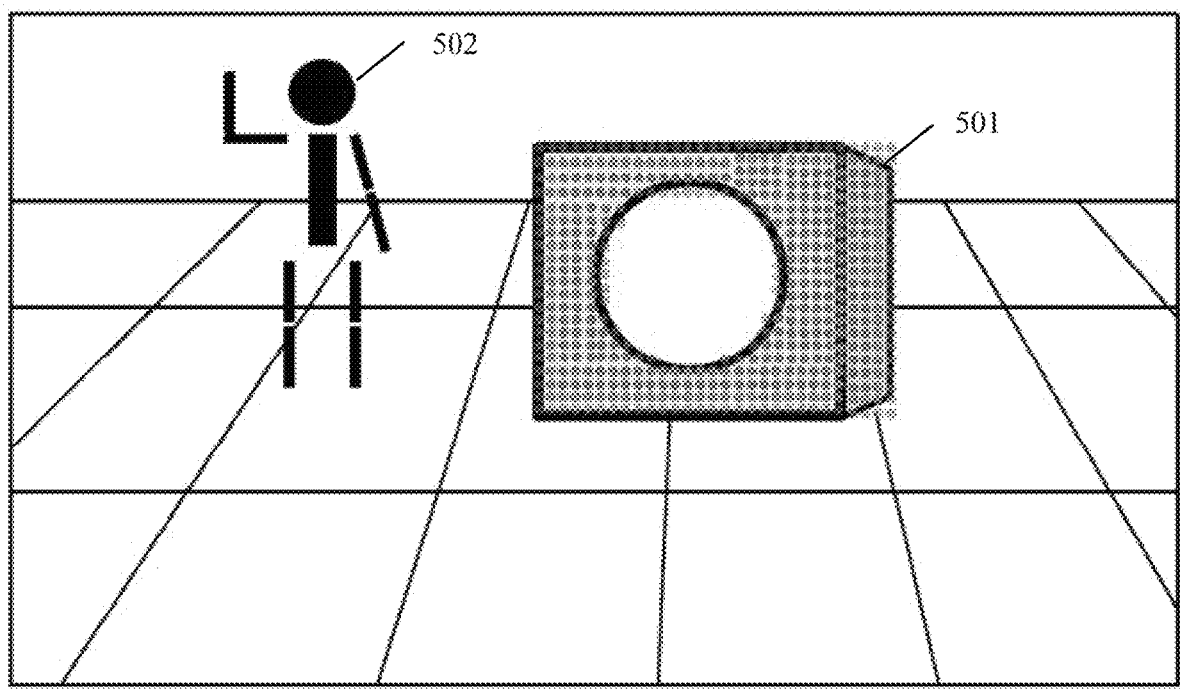
FIG. 6 is a schematic illustration of a display effect of the real time image, according to an example embodiment.

In some embodiments, when the control terminal receives the real time images as shown in FIG. 5, the obstacle in the flight space may trigger an obstacle avoidance operation of the UAV. When the control terminal receives information of the obstacle transmitted by the UAV, the control terminal may map the information of the obstacle onto the real time image displayed on the interactive device, as shown in FIG. 5. That is, the control terminal may display the information of the obstacle on the real time image displayed on the interactive device in certain manner. The display discussed here is not limited to directly displaying the information of the obstacle transmitted by the UAV on the real time image. In some embodiments, the control terminal may convert the information of the obstacle into other form, such as an icon (e.g., numerical icon, text icon, graphical icon, or any combination thereof, etc.), and then display the icon on the real time image. In some embodiments, the information of the obstacle may be mapped onto the real time image displayed on the interactive device as shown in FIG. 5 in the form of an icon. This may be implemented in any of the following methods:

In one detailed implementation method, mapping the information of the obstacle onto the real time image displayed on the interactive device may include: mapping the information of the obstacle onto the obstacle triggering the obstacle avoidance operation included in the real time image displayed on the interactive device. For example, when the real time image received by the UAV includes the obstacle that triggers the obstacle avoidance operation, i.e., when the obstacle that triggers the obstacle avoidance operation is within an imaging range of the imaging device of the UAV, as shown in FIG. 6, if the obstacle that triggers the obstacle avoidance operation is an obstacle 501, the information of the obstacle 501 transmitted by the UAV may be mapped onto an image of the obstacle 501 included in the real time image displayed on the interactive device. That is, based on the information of the obstacle 501, an icon may be displayed on the image of the obstacle 501 included in the real time image. As such, when an icon appears on an image of an obstacle in the real time image, the user may know that the UAV is currently performing an obstacle avoidance operation, and may know which obstacle in the real time image triggers the obstacle avoidance operation of the UAV.

Figure 7:
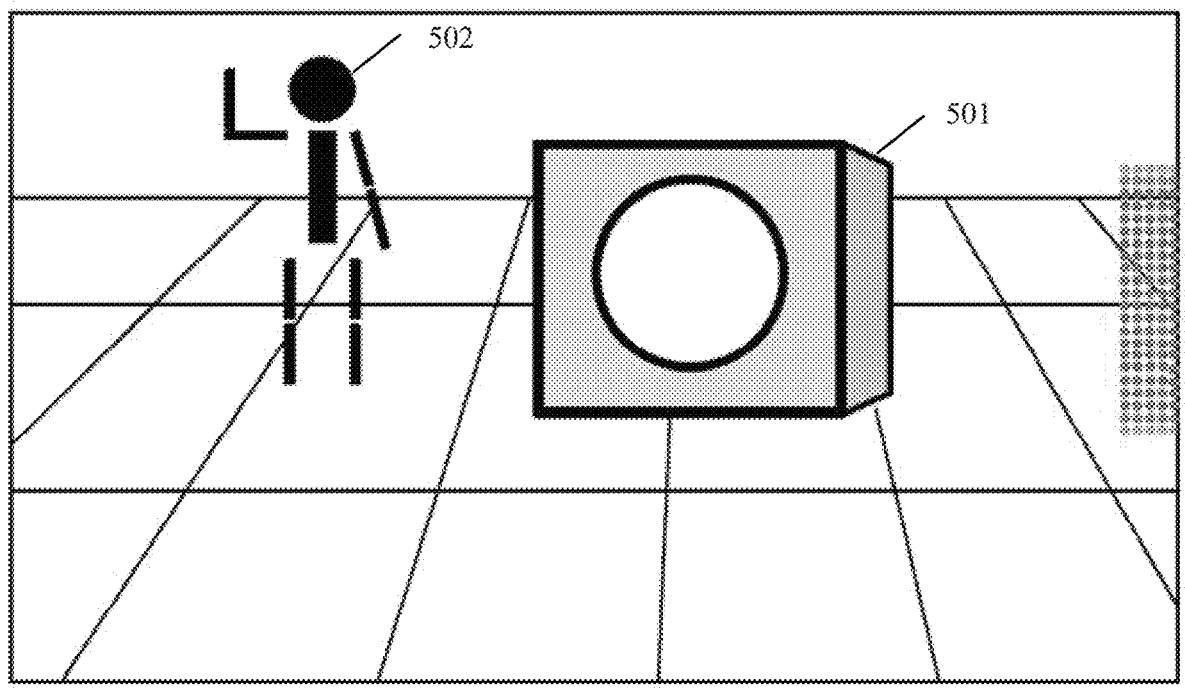
FIG. 7 is a schematic illustration of a display effect of the real time image, according to an example embodiment.

In another detailed implementation method, mapping the information of the obstacle onto the real time image displayed on the interactive device may include: mapping the information of the obstacle to an edge of the real time image displayed on the interactive device. For example, as discussed above, through querying the already generated obstacle map, and in combination of the location information of itself, the UAV may perform obstacle avoidance operations with respect to obstacles in directions such as in the backward direction and side direction, where obstacle avoidance devices are not provided. In some embodiments, obstacles in these directions are typically not within the imaging range of the imaging device of the UAV. As shown in FIG. 7, the obstacle triggering the obstacle avoidance operation is not included in the real time image. At this moment, after receiving the information of the obstacle transmitted by the UAV, a relative orientation of the obstacle relative to the UAV may be determined based on the information of the obstacle. The information of the obstacle may be mapped to an edge of the real time image displayed on the interactive device in the form of an icon. As shown in FIG. 7, by observing the real time image, the user may know that the UAV is currently performing an obstacle avoidance operation, and that the obstacle triggering the obstacle avoidance operation is located on the left side in the imaging direction of the imaging device of the UAV. As such, the user may know in which direction the obstacle triggering the obstacle avoidance operation is located relative to the UAV.

In the technical solutions of the present disclosure, when the obstacle avoidance operation of the UAV is triggered, the control terminal may map the information of the obstacle onto the real time image displayed on the interactive display. As such, when the obstacle avoidance operation of the UAV is triggered, the user may know, through the control terminal, which obstacle in the flight space currently triggers the obstacle avoidance operation of the UAV. At this moment, the user can timely realize that the UAV is performing an obstacle avoidance operation, and would not misconceive that the UAV is having malfunctions itself. Accordingly, the user can timely know the currently flight status of the UAV.

In some embodiments, based on one or more of attitude information of the imaging device of the UAV, parameter information of the imaging device, and the location information of the UAV, the information of the obstacle may be mapped onto the real time image displayed on the interactive device. For example, when an obstacle triggers an obstacle avoidance operation in the UAV, the UAV may transmit attitude information of the imaging device to the control terminal. In some embodiments, the parameter information of the imaging device may include one or more of a focal length, field of view ("FOV"), an internal parameter, an external parameter of the imaging device.

In some embodiments, as discussed above, the information of the obstacle may be mapped onto the real time image displayed on the interactive device in the form of an icon. For example, the icon may be any icon that may provide a notification of the obstacle that triggers the obstacle avoidance operation. As shown in FIG. 6 and FIG. 7, the information of the obstacle may be mapped onto the real time image displayed on the interactive device in the form of a circular point array icon. The icon being a circular point array icon is only for illustrative purposes. A person having ordinary skills in the art can use other forms of icons, such as a triangular point array icon, a rectangular point array icon, a high-bright icon, a frame selection icon, etc. The high-bright icon may highlight or highlight and flash the obstacle triggering the obstacle avoidance operation in the real time image. In some embodiments, the high-bright icon may highlight or highlight and flash the edge of the real time image. The frame selection icon may frame and select the obstacle that triggers the obstacle avoidance operation in the real time image, and may further highlight and flash the frame-selected icon. In some embodiments, in FIG. 6, on the obstacle 501 that triggers the obstacle avoidance operation, the icon that is closer to the edge of the obstacle may have a higher transparency level. A person having ordinary skills in the art can set the transparency level of the icon using other methods, which are not limited by the present disclosure. In addition, the size and color of the icon may be set by the person having ordinary skills in the art based on need and visual effects, which are not limited by the present disclosure.

In some embodiments, one or more of the icon parameters, such as the type, size, color, and transparency level, may be parameters determined based on the above information of the obstacles. As such, when icon information indicating information of the obstacles appears on the real time image, the user may know that an obstacle avoidance operation is triggered in the UAV. In the icon information corresponding to the information of the obstacles, the size of the icon may have an inversely proportional relationship with the depth value of the corresponding obstacle. That is, in the above icon information, the larger the depth value of the obstacle corresponding to an icon, the smaller the size of the icon. Conversely, the smaller the depth value of the obstacle corresponding to the icon, the larger the size of the icon. In some embodiments, in the icon information corresponding to the information of the obstacles, the larger the depth value of the obstacle corresponding to a certain icon, the lighter the color of the icon. Conversely, the smaller the depth value of the obstacle corresponding to a certain icon, the darker the color of the icon. In some embodiments, in the icon information corresponding to the information of the obstacle, the transparency level of the icon may have a proportional relationship with the depth value of the obstacle corresponding to the icon. That is, the larger the depth value of the obstacle corresponding to a certain icon, the larger the transparency level of the icon. Conversely, the smaller the depth value of the obstacle corresponding to a certain icon, the smaller the transparency level of the icon. In some embodiments, the type of the icon may be determined based on an amount of information of the obstacle. For example, if the amount of information of the obstacle is relatively large, the type of icon adopted may be a circular icon. If the amount of information of the obstacle is relatively small, the type of icon adopted may be a triangular icon.

In some embodiments, after the information of the obstacles is mapped to a region of the real time image, the region of the real time image may be processed with to flash. A frequency of the flash may be determined based on a value of the smallest depth value of the obstacles included in the information of the obstacles. For example, the value of the smallest depth value of the obstacles may have an inversely proportional relationship with the frequency of flash.

When a user operates the UAV, the user may often need to observe the flight status of the UAV. Therefore, the user may not timely notice the change in the display content of the real time image. To enable the user to timely know the interference of the obstacle with the flight status of the UAV, in the present disclosure, when the information of the obstacle is mapped onto the real time image displayed on the interactive display, voice notification information may be generated based on the information of the obstacle, and the voice notification information may be played.

Figure 8:
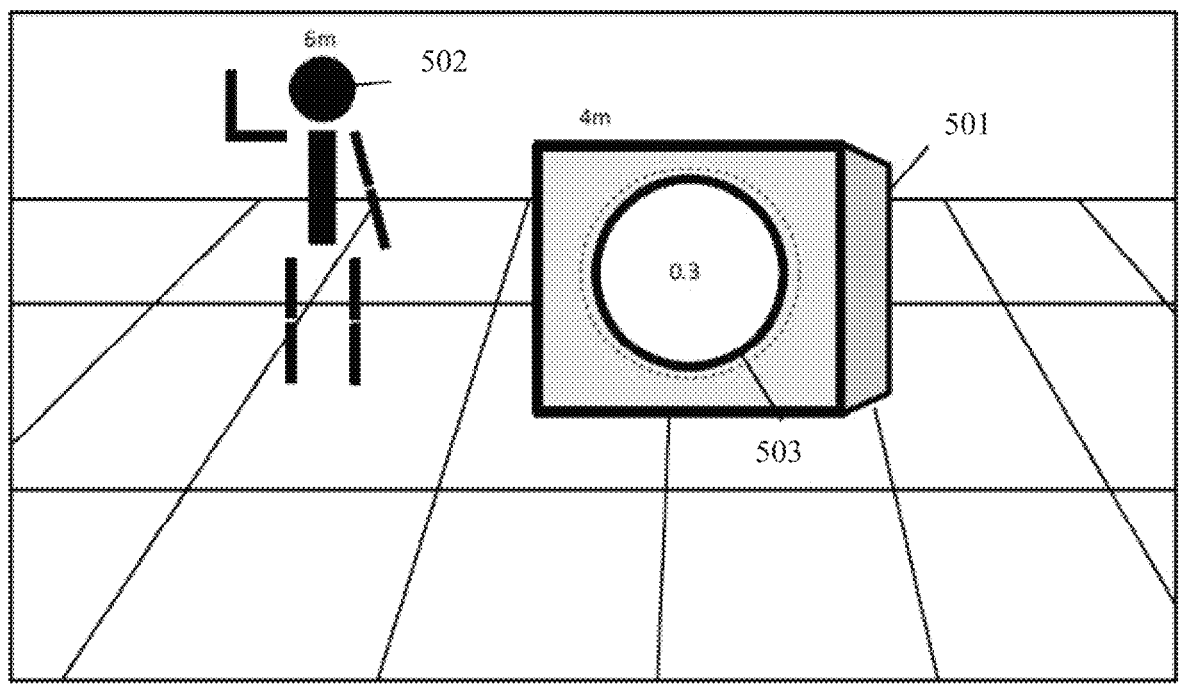
FIG. 8 is a schematic illustration of a display effect of the real time image, according to an example embodiment.
Figure 9:
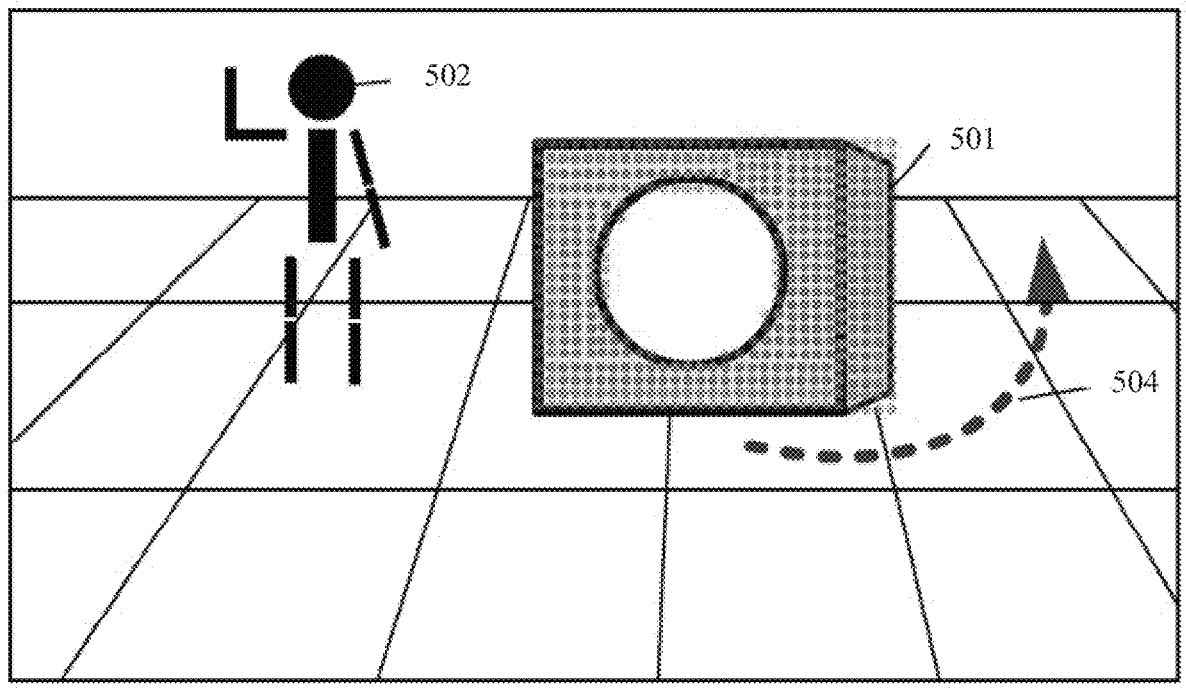
FIG. 9 is a schematic illustration of a display effect of the real time image, according to an example embodiment.

In some embodiments, the information regarding the likelihood of passing a gap between the obstacles transmitted by the UAV may be received. The information regarding the likelihood of passing the gap may be mapped onto the real time image displayed on the interactive device. For example, as discussed above, the UAV may transmit the information regarding the likelihood of passing the gap between the obstacles to the control terminal. The control terminal may map the information regarding the likelihood of passing the gap onto the real time image displayed on the interactive device. As shown in FIG. 8, the obstacle 501 may include a through hole 503. By querying the already generated map, the UAV may obtain the size of the through hole 503. The UAV may transmit information regarding the likelihood of passing the through hole 503 to the control terminal. For example, the control terminal may map the safety factor (0.3) included in the information regarding the likelihood of passing the through hole 503 onto the through hole 503. Alternatively or additionally, the control terminal may map the information regarding the likelihood of passing the through hole 503 onto the through hole 503 in the form of an icon. For example, when the safety factor is smaller than a predetermined safety factor value, the control terminal may notify the user that the through hole 503 cannot be passed by mapping an icon, such as the dotted circular icon shown in FIG. 8. As such, the user may intuitively determine whether the UAV can pass the gap between the obstacles by observing the real time image.

In some embodiments, information of a flight path that circumvents an obstacle triggering an obstacle avoidance operation transmitted by the UAV may be received. The related information may be mapped onto the real time image displayed on the interactive device. For example, as discussed above, the UAV may determine a flight path that circumvents the obstacle that triggers the obstacle avoidance operation through querying the obstacle map. The UAV may transmit the information of the flight path to the control terminal. The control terminal may map the information of the flight path onto the real time image displayed on the interactive display. As such, by observing the real time image, the user may know that when the UAV performs an obstacle avoidance operation, what type of flight path the UAV may fly along to circumvent the obstacle triggering the obstacle avoidance operation. The method of determining the flight path may refer to the corresponding content of the previous embodiments, which is not repeated.

In the technical solutions of the present disclosure, when an obstacle avoidance operation is triggered in the UAV, the information of the corresponding obstacle may be mapped onto the real time image captured by the imaging device of the UAV. As such, when the obstacle avoidance operation of the UAV is triggered, the information of the obstacle will appear on the real time image. The user may timely recognize that the UAV is currently performing an obstacle avoidance operation, rather than having malfunctions in itself, thereby enhancing the user experience.

Figure 10:
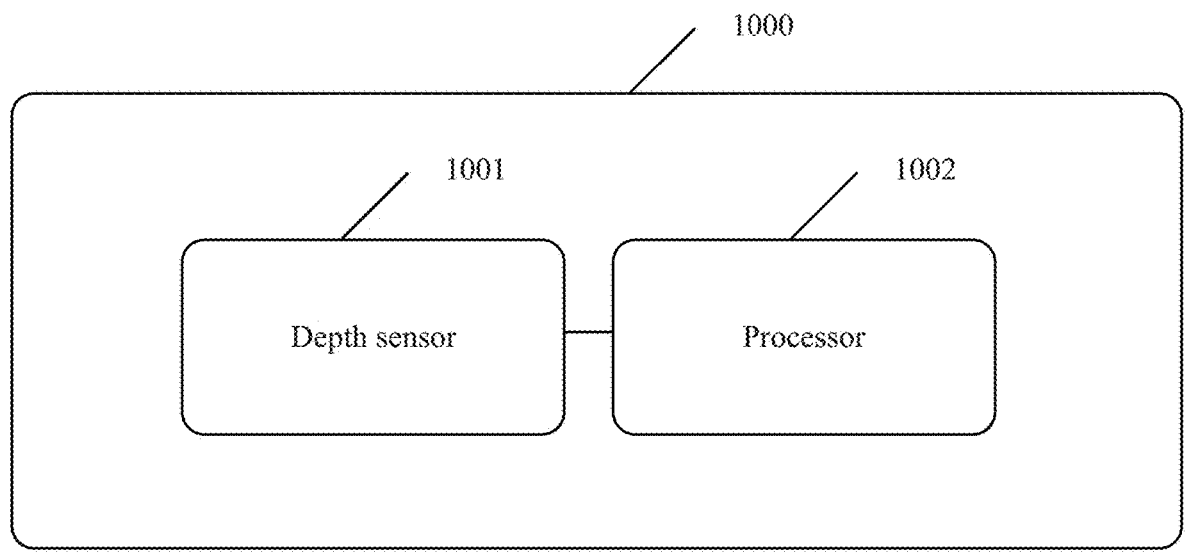
FIG. 10 is a schematic diagram of a structure of a UAV control device, according to an example embodiment.

The present disclosure provides a UAV control device (i.e., a device for controlling a UAV). FIG. 10 is a schematic illustration of a structure of the UAV control device. A UAV control device 1000 may include:

a depth sensor 1001 configured to obtain depth data of one or more obstacles in a flight space;

one or more processors 1002, operating separately or in collaboration, configured to: determine information of an obstacle triggering an obstacle avoidance operation based on the depth data and transmit the information of the obstacle to a control terminal of the UAV.

In some embodiments, the one or more processors 1002 may be configured to generate an obstacle map based on the depth data, and obtain information of the obstacle triggering the obstacle avoidance operation from the obstacle map.

In some embodiments, the one or more processors 1002 may be configured to: determine whether to trigger the obstacle avoidance operation based on the obstacle map.

In some embodiments, the one or more processors 1002 may be configured to: determine whether to trigger the obstacle avoidance operation based on the obstacle map and location of the UAV.

In some embodiments, the depth sensor 1001 may be configured to obtain multiple frames of depth data of one or more obstacles in the flight space.

In some embodiments, the one or more processor 1002 may be configured to generate the obstacle map based on the multiple frames of depth data.

In some embodiments, the one or more processor 1002 may be configured to: assign weight values to at least two frames of depth data included in the multiple frames of depth data based on a predetermined computational model, and generate the obstacle map based on the assigned weight values and the corresponding depth data.

In some embodiments, the predetermined computational model may include a measurement accuracy model of the depth sensor.

In some embodiments, the one or more processor 1002 may be configured to: obtain location information and/or attitude information of the UAV, and generate the obstacle map based on the depth data and the location information and/or the attitude information of the UAV.

In some embodiments, the one or more processor 1002 may be configured to: pre-process the obtained depth data, and generate the obstacle map based on the pre-processed depth data.

In some embodiments, the pre-processing may include a morphological filtering process.

In some embodiments, the one or more processor 1002 may be configured to: determine a portion of the obstacle map to be deleted, and delete the portion of the obstacle map.

In some embodiments, the one or more processor 1002 may be configured to: determine the portion of the obstacle map to be deleted based on one or more of location information of the UAV and a predetermined distance value.

In some embodiments, the one or more processor 1002 may be configured to: determine distance information of a gap between obstacles based on the obstacle map, determine information regarding a likelihood of passing the gap based on the distance information, and transmit the information regarding the likelihood of passing the gap to a control terminal.

In some embodiments, the one or more processor 1002 may be configured to: determine a flight path that circumvents the obstacle triggering the obstacle avoidance operation based on the obstacle map.

In some embodiments, the one or more processor 1002 may be configured to: transmit information relating to the flight path to the control terminal.

Figure 11:
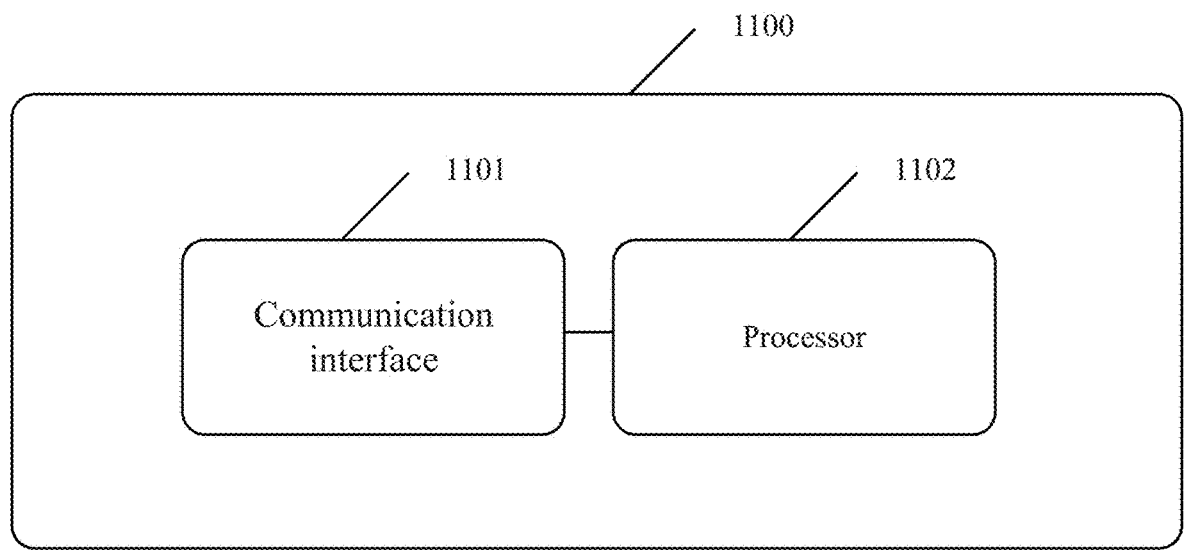
FIG. 11 is a schematic diagram of a structure of an obstacle notification device, according to an example embodiment.

The present disclosure provides an obstacle notification device. FIG. 11 is a schematic illustration of a structure of the obstacle notification device. An obstacle notification device 1100 may include:

a communication interface 1101 configured to receive real time images captured by an imaging device of the UAV, and to receive information of an obstacle that triggers the obstacle avoidance operation transmitted by the UAV;

one or more processors 1102, operating separately or in collaboration, configured to: map the information of the obstacle onto the real time image displayed on the interactive device.

In some embodiments, the one or more processors 1102 may be configured to: map the information of the obstacle onto the obstacle included in the real time image that triggers the obstacle avoidance operation.

In some embodiments, the one or more processors 1102 may be configured to: map the information of the obstacle onto an edge of the real time image displayed on the interactive device.

In some embodiments, the one or more processors 1102 may be configured to: obtain attitude information of the imaging device and/or parameter information of the imaging device transmitted by the UAV, and map the information of the obstacle onto the real time image displayed on the interactive device based on the attitude information of the imaging device and/or the parameter information of the imaging device.

In some embodiments, the parameter information of the imaging device may include: one or more of a focal length, an FOV, an internal parameter, or an external parameter of the imaging device.

In some embodiments, the one or more processors 1102 may be configured to: map the information of the obstacle onto the real time image displayed on the interactive display in a form of an icon.

In some embodiments, one or more of the icon parameters, including the type, size, color, and transparency level of the icon, are the parameters determined based on the information of the obstacle.

In some embodiments, the communication interface 1101 may be configured to receive information regarding the likelihood of passing a gap between obstacles transmitted by the UAV.

In some embodiments, the one or more processors 1102 may be configured to: map the information regarding the likelihood of passing the gap onto the real time image displayed on the interactive device.

In some embodiments, the communication interface 1101 may be configured to receive information related to a flight path that circumvents the obstacle triggering the obstacle avoidance operation transmitted by the UAV.

In some embodiments, the one or more processors 1102 may be configured to: map the information related to the flight path onto the real time image displayed on the interactive device.

The present disclosure provides a UAV. The UAV may include:

an aircraft body;

a propulsion system mounted on the aircraft body and configured to provide a flight propulsion; and the UAV control device disclosed herein.

In the technical solutions of the present disclosure, when an obstacle avoidance operation is triggered in the UAV, the information of the corresponding obstacle may be mapped to the real time image captured by the imaging device of the UAV. As such, when the obstacle avoidance operation is triggered in the UAV, information of the corresponding obstacle may appear on the real time image. Then, the user may timely recognize that the UAV is performing an obstacle avoidance operation, and would not misconceive that the UAV is having malfunctions itself, thereby enhancing the user experience.

The present disclosure provides a UAV control method, including:

Step S1201: obtaining a real time mage captured by an imaging device;

Step S1202: obtaining depth data of obstacles in a flight space;

Step S1203: determining information of an obstacle that triggers an obstacle avoidance operation based on the depth data;

Step S1204: map the information of the obstacle onto the real time image.

Step S1204: transmit the mapped real time image to a control terminal.

Specifically, differing from the previous embodiments, in this embodiment, after determining information of the obstacle triggering the obstacle avoidance operation based on the depth data, the processor of the UAV may map the information of the obstacle triggering the obstacle avoidance operation onto the real time image. For example, the information of the obstacle may be mapped onto the real time image in the form of an icon. In some embodiments, the information of the obstacle may be mapped onto the obstacle triggering the obstacle avoidance operation included in the real time image. In some embodiments, the information of the obstacle may be mapped at the edge of the real time image. Compared with the previous embodiments, in this embodiment, the mapping is performed at the UAV side, and in the previous embodiments, the mapping is performed at the control terminal side. Except for this difference, the methods for generating the obstacle map based on the depth data, and for mapping the information of the obstacle onto the real time image are the same as those of the previous embodiments. Therefore, the corresponding portions of the descriptions of the previous embodiments may be applicable to this embodiment, which are not repeated.

It is understood that the present disclosure does not limit the sequence of step S1201 and S1202. These steps may be executed in sequence, or may be executed simultaneously.

The present disclosure also provides an obstacle notification method, including:

receiving a real time image transmitted by the UAV, where, the real time image is mapped with information of an obstacle that triggers an obstacle avoidance operation; and displaying the real time image on an interactive device.

The present disclosure also provides a UAV control device, including:

an imaging device configured to obtain a real time image;

a depth sensor configured to obtain depth data of obstacles in a flight space;

a processor configured to determine information of an obstacle that triggers an obstacle avoidance operation based on the depth data;

map the information of the obstacle onto the real time image; and transmit the mapped real time image to the control terminal.

Specifically, differing from previous embodiments, in this embodiment, after determining the information of the obstacle triggering the obstacle avoidance operation based on the depth data, the processor of the UAV may map the information of the obstacle triggering the obstacle avoidance operation onto the real time image. For example, the processor may map the information of the obstacle onto the real time image in the form of an icon. In some embodiments, the processor may map the information of the obstacle onto the obstacle triggering the obstacle avoidance operation included in the real time image. In some embodiments, the processor may map the information of the obstacle at the edge of the real time image. Compared with the previous embodiments, the mapping in this embodiment is performed at the UAV side, and in the previous embodiments, the mapping is performed at the control terminal side. Except for this difference, the processes performed by the processor for generating the obstacle map based on the depth data, and for mapping the information of the obstacle onto the real time image are the same as those of the previous embodiments. Therefore, descriptions of corresponding portions of the previous embodiments can be applicable to this embodiment, which are not repeated.

The present disclosure also provides an obstacle notification device, including:
- a communication interface configured to receive a real time image transmitted by the UAV, where, the real time image includes information of an obstacle that triggers an obstacle avoidance operation in the UAV; and
- a processor configured to display the real time image on an interactive device.

The present disclosure also provides a UAV, including:
- an aircraft body;
- a propulsion system mounted on the aircraft body and configured to provide a flight propulsion; and
- the control device of the UAV as described above.

A person having ordinary skill in the art can appreciate that the various system, device, and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed. Further, couplings, direct couplings, or communication connections may be implemented using indirect coupling or communication between various interfaces, devices, or units. The indirect couplings or communication connections between interfaces, devices, or units may be electrical, mechanical, or any other suitable type.

In the descriptions, when a unit or component is described as a separate unit or component, the separation may or may not be physical separation. The unit or component may or may not be a physical unit or component. The separate units or components may be located at a same place, or may be distributed at various nodes of a grid or network. The actual configuration or distribution of the units or components may be selected or designed based on actual need of applications.

Various functional units or components may be integrated in a single processing unit, or may exist as separate physical units or components. In some embodiments, two or more units or components may be integrated in a single unit or component. The integrated unit may be realized using hardware or a combination of hardware and software.

If the integrated units are realized as software functional units and sold or used as independent products, the integrated units may be stored in a computer-readable storage medium. Based on such understanding, the portion of the technical solution of the present disclosure that contributes to the current technology, or some or all of the disclosed technical solution may be implemented as a software product. The computer software product may be storage in a non-transitory storage medium, including instructions or codes for causing a computing device (e.g., personal computer, server, or network device, etc.) to execute some or all of the steps of the disclosed methods. The storage medium may include any suitable medium that can store program codes or instruction, such as at least one of a U disk (e.g., flash memory disk), a mobile hard disk, a read-only memory ("ROM"), a random access memory ("RAM"), a magnetic disk, or an optical disc.

A person having ordinary skill in the art can appreciate that for convenience and simplicity, the above descriptions described the division of the functioning units. In practical applications, the disclosed functions may be realized by various functioning units. For example, in some embodiments, the internal structure of a device may be divided into different functioning units to realize all or part of the above-described functions. The detailed operations and principles of the device are similar to those described above, which are not repeated.

The above embodiments are only examples of the present disclosure, and do not limit the scope of the present disclosure. Although the technical solutions of the present disclosure are explained with reference to the above-described various embodiments, a person having ordinary skills in the art can understand that the various embodiments of the technical solutions may be modified, or some or all of the technical features of the various embodiments may be equivalently replaced. Such modifications or replacement do not render the spirit of the technical solutions falling out of the scope of the various embodiments of the technical solutions of the present disclosure.

What is claimed is:

1. A method for controlling an aerial vehicle, comprising:
obtaining depth data of one or more obstacles in a flight space;
obtaining, based on the depth data, information of an obstacle that triggers an obstacle avoidance operation;
controlling the aerial vehicle to capture a real time image, and transmitting the real time image to a control terminal of the aerial vehicle to enable the control terminal to display the real time image on an interactive device of the control terminal;
transmitting the information of the obstacle to the control terminal of the aerial vehicle to enable the control terminal to present a marker on the real time image displayed on the interactive device of the control terminal based on the information of the obstacle, the marker being configured to indicate a location of the obstacle that triggers the obstacle avoidance operation in the real time image or a relative orientation of the obstacle relative to the aerial vehicle in the real time image; and
responding to the obstacle being not included in the real time image, determining the relative orientation of the obstacle relative to the aerial vehicle based on the information of the obstacle;

wherein the relative orientation of the obstacle relative to the aerial vehicle is transmitted to the control terminal of the aerial vehicle to enable the control terminal to display the relative orientation of the obstacle relative to the aerial vehicle in the real time image via the marker.

2. The method of claim 1, further comprising:
generating an obstacle map based on the depth data; and
determining whether to trigger the obstacle avoidance operation based on the obstacle map.

3. The method of claim 2, wherein determining whether to trigger the obstacle avoidance operation based on the obstacle map comprises:
determining whether to trigger the obstacle avoidance operation based on the obstacle map and a location of the aerial vehicle.

4. The method of claim 2,
wherein obtaining the depth data of the one or more obstacles in the flight space comprises obtaining multiple frames of depth data of the one or more obstacles in the flight space, and
wherein generating the obstacle map based on the depth data comprises generating the obstacle map based on the multiple frames of depth data.

5. The method of claim 4, wherein generating the obstacle map based on the multiple frames of depth data comprises:
assigning weigh values to at least two frames of depth data included in the multiple frames of depth data based on a predetermined computational model, and generating the obstacle map based on the assigned weight values and corresponding depth data.

6. The method of claim 5, wherein the predetermined computational model comprises a measurement accuracy model of a depth sensor.

7. The method of claim 2, further comprising:
pre-processing the depth data,
wherein generating the obstacle map based on the depth data comprises:
generating the obstacle map based on the pre-processed depth data.

8. The method of claim 2, further comprising:
determining a portion of the obstacle map to be deleted, and deleting the portion of the obstacle map to be deleted.

9. The method of claim 8, wherein determining the portion of the obstacle map to be deleted comprises determining the portion of the obstacle map to be deleted based on one or more of location information of the aerial vehicle and a predetermined distance value.

10. The method of claim 2, further comprising:
determining distance information of a gap between obstacles based on the obstacle map;
determining information regarding a likelihood of passing the gap based on the distance information; and
transmitting the information regarding the likelihood of passing the gap to the control terminal.

11. The method of claim 2, further comprising:
determining a flight path that circumvents the obstacle that triggers the obstacle avoidance operation based on the obstacle map; and
transmitting information relating to the flight path to the control terminal.

12. The method of claim 2, further comprising:
obtaining at least one of location information or attitude information of the aerial vehicle,
wherein generating the obstacle map based on the depth data comprises:
generating the obstacle map based on the depth data and at least one of the location information or the attitude information of the aerial vehicle.

13. The method of claim 1, wherein the obstacle avoidance operation includes controlling the aerial vehicle to circle or hover to avoid collision of the aerial vehicle with the obstacle.

14. The method of claim 1, wherein transmitting the information of the obstacle to the control terminal of the aerial vehicle to enable the control terminal to present the marker on the real time image displayed on the interactive device of the control terminal based on the information of the obstacle includes:
transmitting the information of the obstacle to the control terminal to enable the control terminal to highlight the marker to indicate the location of the obstacle that triggers the obstacle avoidance operation.

15. A device for controlling an aerial vehicle, comprising:
a depth sensor configured to obtain depth data of one or more obstacles in a flight space;
one or more processors, operating separately or in collaboration and configured to:
obtain, based on the depth data, information of an obstacle that triggers an obstacle avoidance operation;
control the aerial vehicle to capture a real time image and to transmit the real time image to a control terminal of the aerial vehicle to enable the control terminal to display the real time image on an interactive device of the control terminal;
transmit the information of the obstacle to the control terminal of the aerial vehicle to enable the control terminal to present a marker on the real time image displayed on the interactive device of the control terminal based on the information of the obstacle, the marker being configured to indicate a location of the obstacle that triggers the obstacle avoidance operation in the real time image or a relative orientation of the obstacle relative to the aerial vehicle in the real time image; and
responding to the obstacle being not included in the real time image, determining the relative orientation of the obstacle relative to the aerial vehicle based on the information of the obstacle;
wherein the relative orientation of the obstacle relative to the aerial vehicle is transmitted to the control terminal of the aerial vehicle to enable the control terminal to display the relative orientation of the obstacle relative to the aerial vehicle in the real time image via the marker.

16. The device of claim 15, wherein the one or more processors are configured to:
generate an obstacle map based on the depth data; and
determine whether to trigger the obstacle avoidance operation based on the obstacle map.

17. The device of claim 16,
wherein the depth sensor is configured to obtain multiple frames of depth data of the one or more obstacles in the flight space, and
wherein the one or more processors are configured to generate the obstacle map based on the multiple frames of depth data.

18. The device of claim 17, wherein the one or more processors are configured to:
assign weight values to at least two frames of depth data included in the multiple frames of depth data based on a predetermined computational model; and generate the obstacle map based on the assigned weight values and corresponding depth data.

19. The device of claim 18, wherein the one or more processors are configured to:
   determine whether to trigger the obstacle avoidance operation based on the obstacle map and a location of the aerial vehicle.

20. A method for controlling an aerial vehicle, comprising:
   obtaining depth data of a plurality of obstacles in a flight space;
   obtaining, based on the depth data, information of an obstacle that triggers an obstacle avoidance operation;
   controlling the aerial vehicle to capture a real time image, and transmitting the real time image to a control terminal of the aerial vehicle to enable the control terminal to display the real time image on an interactive device of the control terminal;
   transmitting the information of the obstacle to the control terminal of the aerial vehicle to enable the control terminal to present a marker on the real time image displayed on the interactive device of the control terminal based on the information of the obstacle, the marker being configured to indicate a location of the obstacle that triggers the obstacle avoidance operation in the real time image or a relative orientation of the obstacle relative to the aerial vehicle in the real time image;
   determining information regarding a likelihood of passing a gap between the plurality of obstacles; and
   transmitting the information regarding the likelihood of passing the gap to the control terminal, to enable the control terminal to map the information regarding the likelihood of passing the gap onto the real time image displayed on the control terminal.

* * * * *